United States Patent [19]

McComber

[11] Patent Number: 5,950,751
[45] Date of Patent: Sep. 14, 1999

[54] ELECTRICALLY-POWERED VEHICLE WITH SWIVEL SEAT

[75] Inventor: Donald R. McComber, Littleton, Colo.

[73] Assignee: SoloRider Industries, Inc., Englewood, Colo.

[21] Appl. No.: 08/902,307

[22] Filed: Jul. 29, 1997

[51] Int. Cl.[6] .............................. B60K 1/00; B62D 61/06
[52] U.S. Cl. .................. 180/65.1; 180/215; 280/DIG. 5
[58] Field of Search ................................ 180/65.1, 65.6, 180/68.5, 311, 312, 215, 216, 217, 907, 908; 280/124.136, 124.145, 124.135, DIG. 5; 297/344.22

[56] References Cited

U.S. PATENT DOCUMENTS

| | | |
|---|---|---|
| 3,078,946 | 2/1963 | Young, Jr. . |
| 4,019,602 | 4/1977 | Habiger . |
| 4,042,055 | 8/1977 | Ward ........................................... 180/60 |
| 4,458,915 | 7/1984 | Emery ....................................... 280/668 |
| 4,792,188 | 12/1988 | Kawashima .............................. 297/349 |
| 5,020,624 | 6/1991 | Nesterick et al. . |
| 5,090,513 | 2/1992 | Bussinger . |
| 5,341,894 | 8/1994 | Van Gorder, Jr. et al. . |

*Primary Examiner*—Lanna Mai
*Assistant Examiner*—Faye M. Fleming
*Attorney, Agent, or Firm*—Dorsey & Whitney LLP

[57] ABSTRACT

A chassis for a single seat dirigible electric battery-powered personal transportation vehicle is formed by a central elongated beam having a front end and a rear end. A wheeled drive mechanism is mounted on the rear end of the beam. A swivel seat is mounted on the frame in overlying relation to the drive mechanism. A front battery support frame is mounted on the front end of the beam. Spaced apart side plates secured to the front battery support frame support a wheel suspension and steering mechanism. Side battery support frames are mounted on the beam rearwardly adjacent the front battery support frame and extending rearwardly and outwardly from the beam. Batteries mounted in the battery support frames provide electric power to the vehicle and provide a counterbalance to the seat and drive mechanism.

16 Claims, 9 Drawing Sheets

ELECTRICALLY-POWERED VEHICLE WITH SWIVEL SEAT

BACKGROUND OF THE INVENTION

1. Field of the Invention

The present invention relates to land vehicles and particularly to motorized golf cars, utility cars and like personal transportation vehicles. More specifically, the present invention relates to a vehicle finding particular but not exclusive utility as a golf car for a physically-impaired golfer who must play while seated on or supported by the vehicle.

2. Description of the Prior Art

A golf car with a swivel seat for use by ambulatory disadvantaged golfers is described in U.S. Pat. No. 5,341,894. The seat is motor driven from a position for vehicle operation to a golfing position.

OBJECTS OF THE INVENTION

It is the principal object of the present invention to provide an improved vehicle, such as a golf car, for a physically-impaired person.

It is another object of the present invention to provide an improved vehicle of the foregoing character which has a low center of gravity, improved weight distribution, and enhanced stability.

A more specific object of the invention is to provide an improved chassis construction for a personal transportation vehicle of the foregoing character.

Still a more specific object is to provide an improved swivel seat construction for a vehicle adapted for use by a physically-impaired person.

SUMMARY OF THE INVENTION

A single seat dirigible electric battery-powered personal transportation vehicle incorporates a central elongated beam frame having a front end and a rear end. A wheel drive mechanism is mounted on the rear end of the beam. A seat frame supports a seat including a horizontal cushion and a vertical back. To swivel the seat, a swivel pin is secured to the seat frame and extends downwardly therefrom. A telescoping swivel post is mounted on the drive mechanism and extends upwardly for receiving and supporting the swivel pin. To clamp the seat in a selected position, a brake disk is secured to the swivel post and a caliper brake on said seat frame operatively engages the brake disk for releasably holding said seat in a selected swivel position.

A front battery support frame is mounted on the front end of the frame beam. Side battery support frames are mounted on the beam rearwardly adjacent the front battery support frame and extend rearwardly and outwardly therefrom. Batteries mounted in the battery support frames provide electric power to the vehicle and also provide a counterbalance to the seat and drive mechanism, provide a low center of gravity, and provide good weight distribution.

To provide a front wheel suspension, spaced apart side plates are secured to the front battery support frame. A pair of parallel upper and lower suspension arm assemblies are swingably mounted on each plate, and a wheel spindle is mounted between each arm assembly. An axle connected to each spindle supports a wheel hub plate on which the front vehicle wheels are mounted. A coil suspension spring and shock absorber is mounted between each plate and each lower arm assembly.

A steering handle is mounted on the frame beam and is coupled to the wheel spindles so that a golfer can utilize the seat in a forward facing position for driving and steering the vehicle and can swivel the seat to one side or the other of the vehicle. The user fixes the seat in a swiveled position to provide a support when addressing and striking a golf ball.

DESCRIPTION OF THE PREFERRED EMBODIMENT

Figures 1, 2:
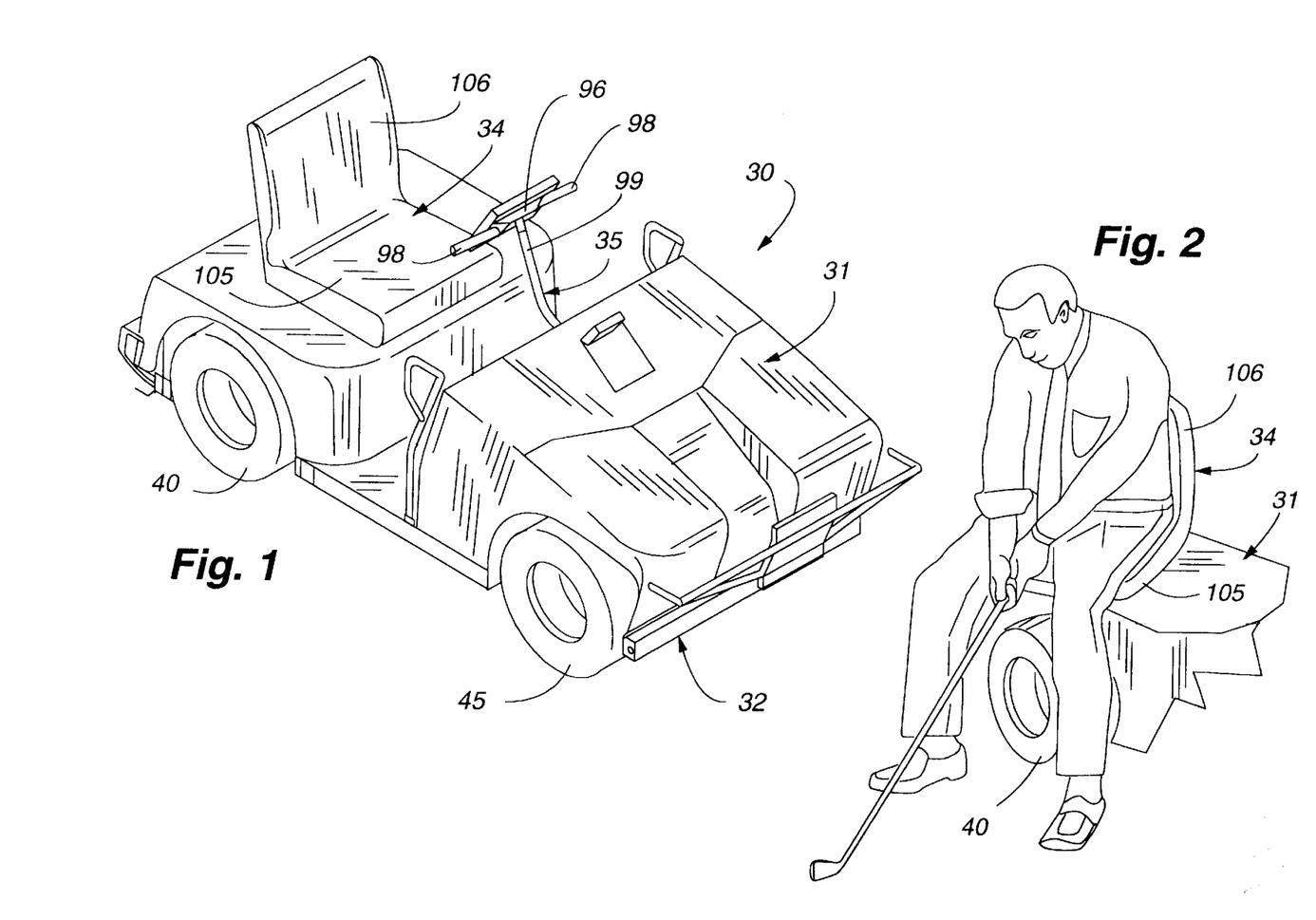
FIG. 1 is a perspective view of a golf car embodying the present invention.
FIG. 2 is a partial perspective view of the golf car shown in FIG. 1 and showing the seat swiveled with a golfer in position for golfing.
Figure 3:
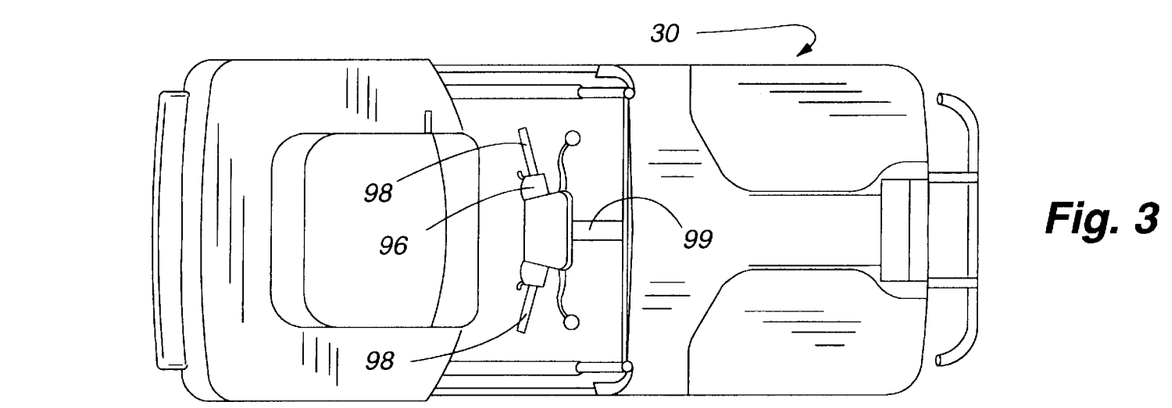
FIG. 3 is a top plan view of the golf car shown in FIG. 1.
Figure 4:
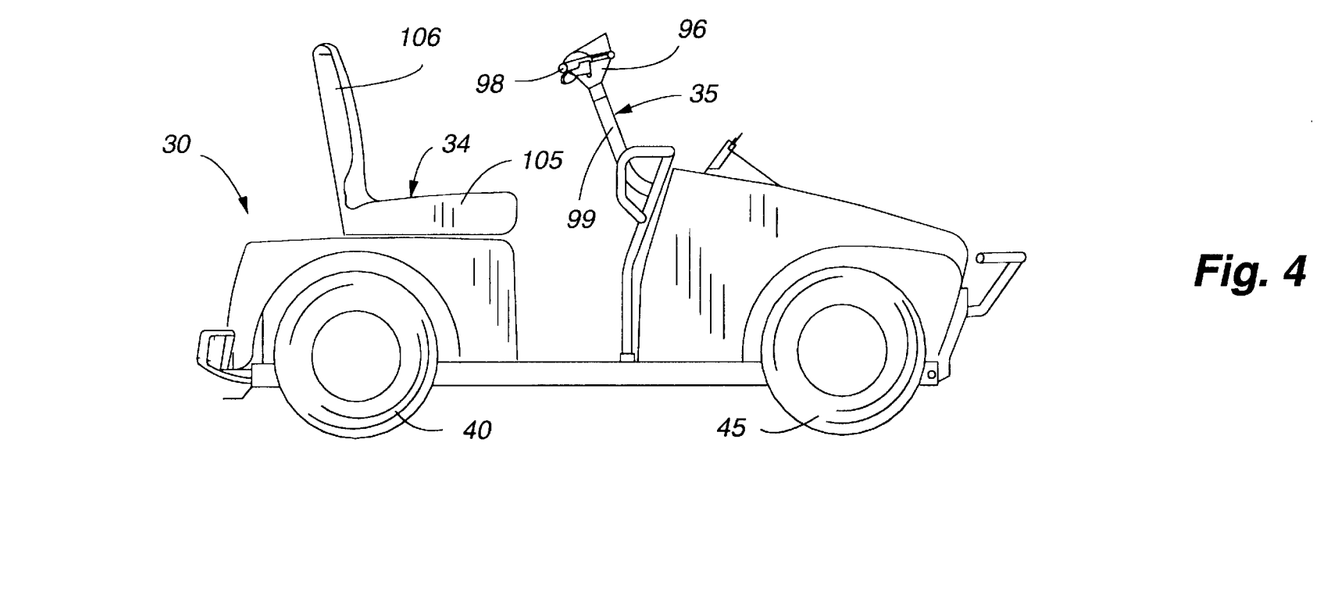
FIG. 4 is a right-side elevation view of the golf car shown in FIG. 1.
Figure 5:
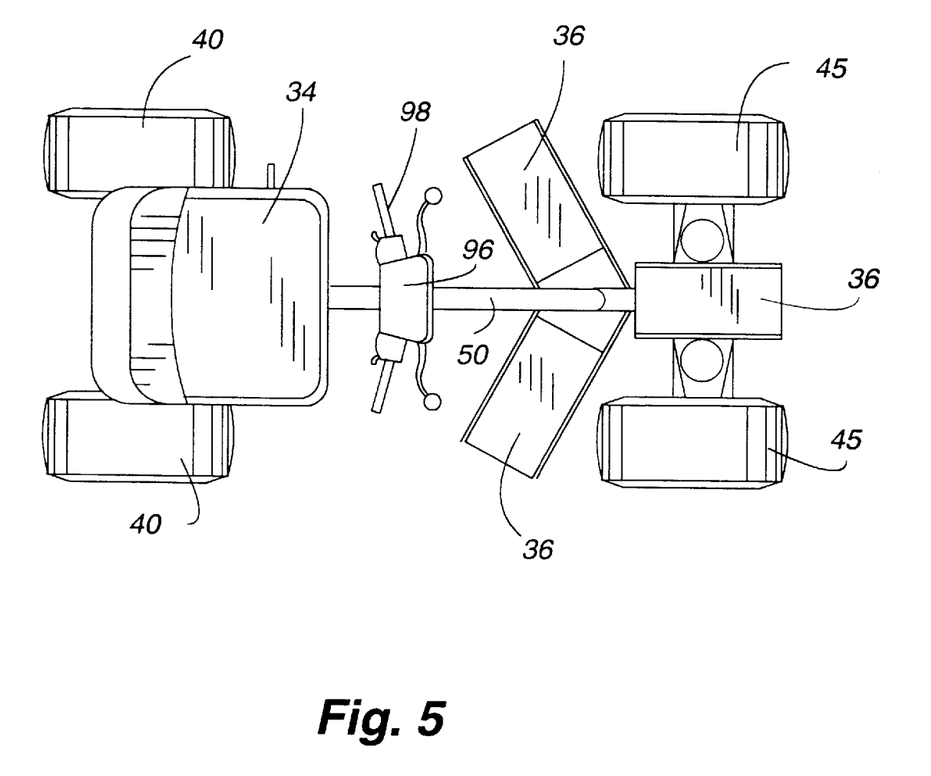
FIG. 5 is a top plan view of the golf car shown in FIG. 1 with the cover or body removed.
Figure 6:
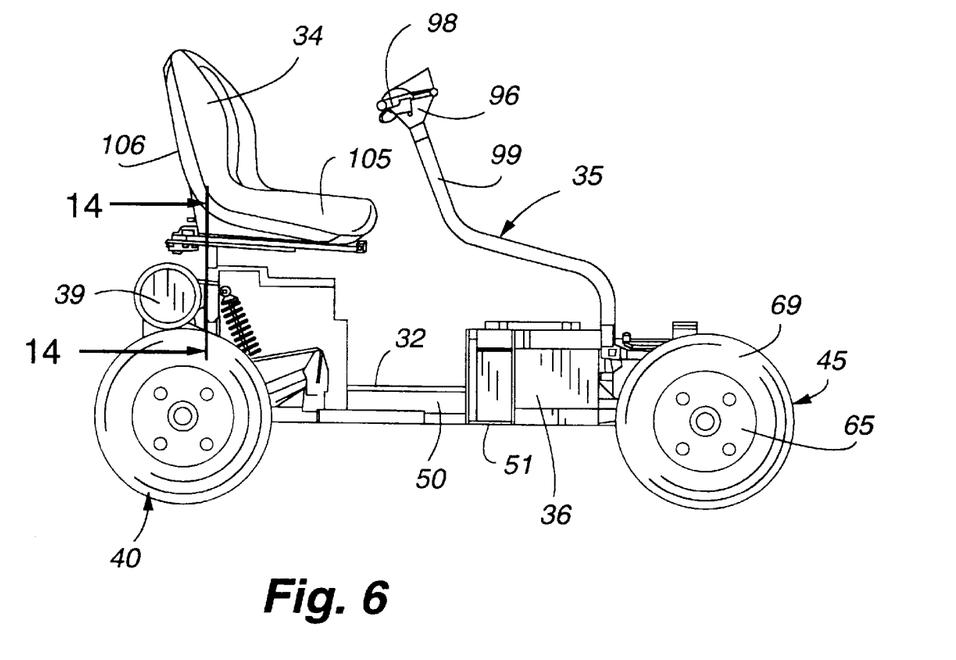
FIG. 6 is a right-side elevation view of the golf car shown in FIG. 5.
Figure 7:
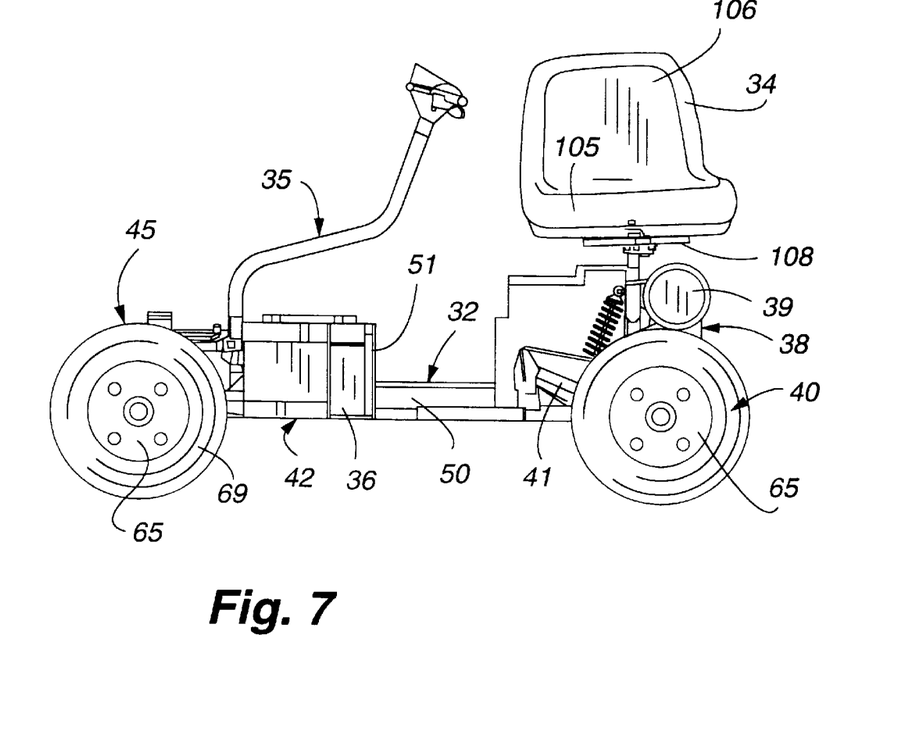
FIG. 7 is a left-side elevation view of the golf car shown in FIG. 5.

The present invention is embodied in a personal transportation vehicle such as a single-seat, dirigible, golf car 30 having a body or body shell 31 and mounted on a wheeled chassis 32 supporting a swivel seat 34 in position for a rider to steer the vehicle with a steering mechanism 35 (FIG. 1). The vehicle, as shown in FIGS. 5, 6 and 7, is powered by batteries 36 mounted on the chassis 32. The batteries 36 power a drive mechanism 38 including an electric motor 39 operatively connected to drive wheels 40 through an appropriate drive train and suspension mechanism 41.

The batteries 36 are mounted adjacent to the front end of the chassis 32 in a battery frame 42 which in turn supports a front wheel suspension mechanism 44 mounting a pair of front wheels 45. The suspension mechanism 44 is operatively connected to the steering mechanism 35 so that the vehicle may be steered by a user seated on the seat 34.

For rigidly supporting the rear mechanism 38 and drive train 41, seat 34, front battery mounting 42, and wheel suspension 44, the chassis 32, as shown in FIGS. 5–7, is constructed in the form of a rigid, elongated beam or frame 50, substantially box-shaped in cross-section and extending from the battery frame assembly 42 to the rear of the vehicle. The chassis frame 50 supports at its rear end the drive mechanism 38 and drive wheel suspension mechanism 41.

At its front end, the frame 50 supports the battery mounting frame assembly 42 and front wheel suspension 44. The swivel seat 34 is mounted on the frame above the drive mechanism 38. Three battery mounting frames 51 are mounted on the front end of the chassis frame 50, each being adapted to receive a battery 36, such as a lead acid battery, to power the drive motor 39 of the vehicle. The battery assembly 42 includes battery supporting frames 51 mounted on the chassis rail or frame 50 in a Y-shaped configuration so that the weight of the batteries 36 is distributed both forwardly and laterally of the vehicle and in a configuration to provide a vehicle having a low center of gravity. To this end, the battery frames 51 are mounted in a generally Y-shaped configuration with one battery frame mounted on and extending forwardly of the chassis frame rail 50 at the front end thereof, and the other two battery frames 51 mounted on and extending outwardly in a rearwardly inclined configuration laterally of the frame 50. Each battery frame 51 supports, contains and protects a battery 36, such as a lead acid rechargeable battery.

Figure 10:
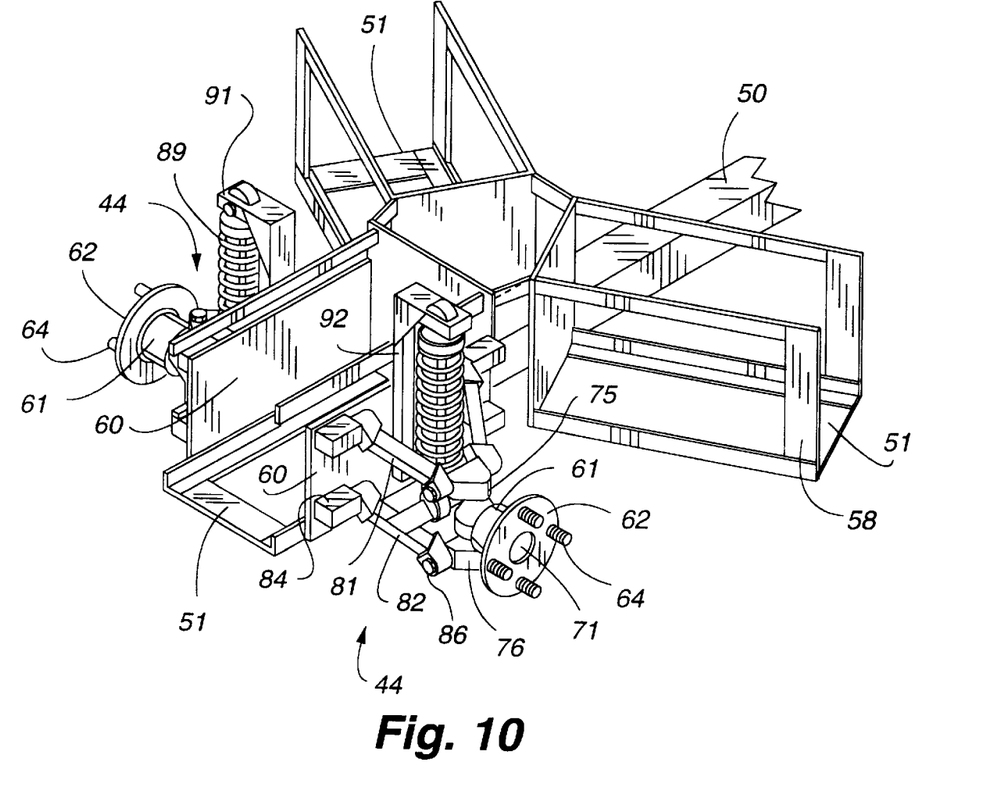
FIG. 10 is an enlarged perspective view of the chassis battery mounting structure incorporated in the golf car shown in FIG. 1.

With the Y-shaped battery mounting configuration, as shown in FIG. 10, the batteries are distributed on the front of the frame in a manner which provides a low center of gravity for the vehicle as well as a counterbalance to the drive train, seat and rider on the rear. The vehicle is balanced so that a rider may sit or lean to one side of the vehicle, and the vehicle remains stable even on a sloping surface such as a hill or mound on a golf course.

Figure 8:
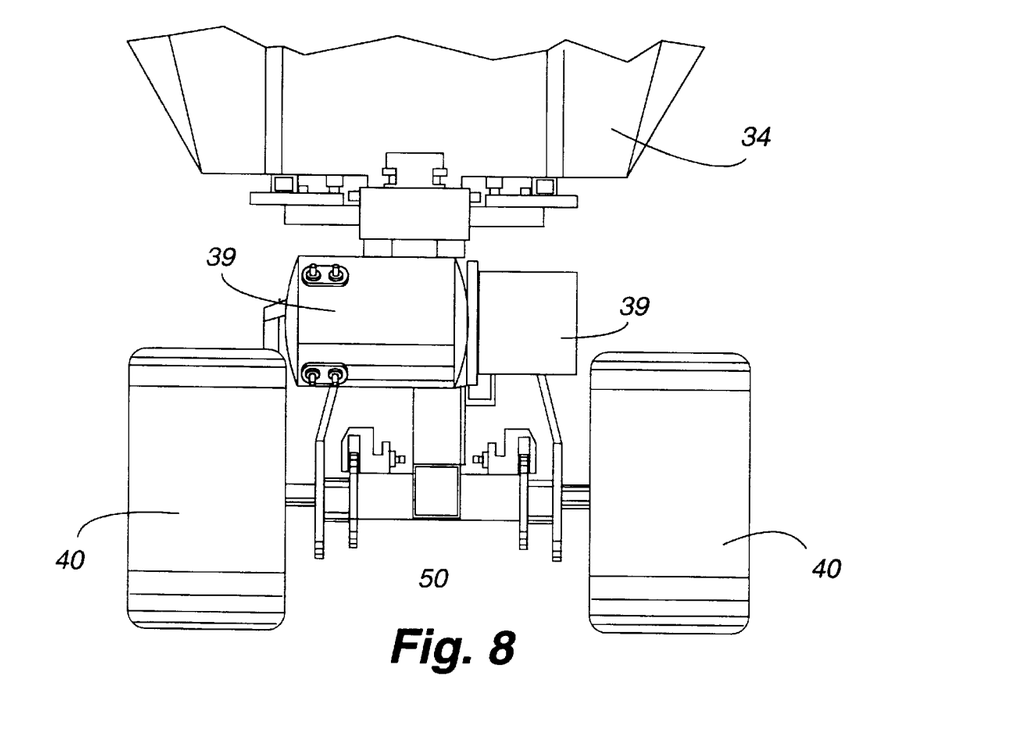
FIG. 8 is a rear elevation view of the golf car shown in FIG. 5.
Figure 9:
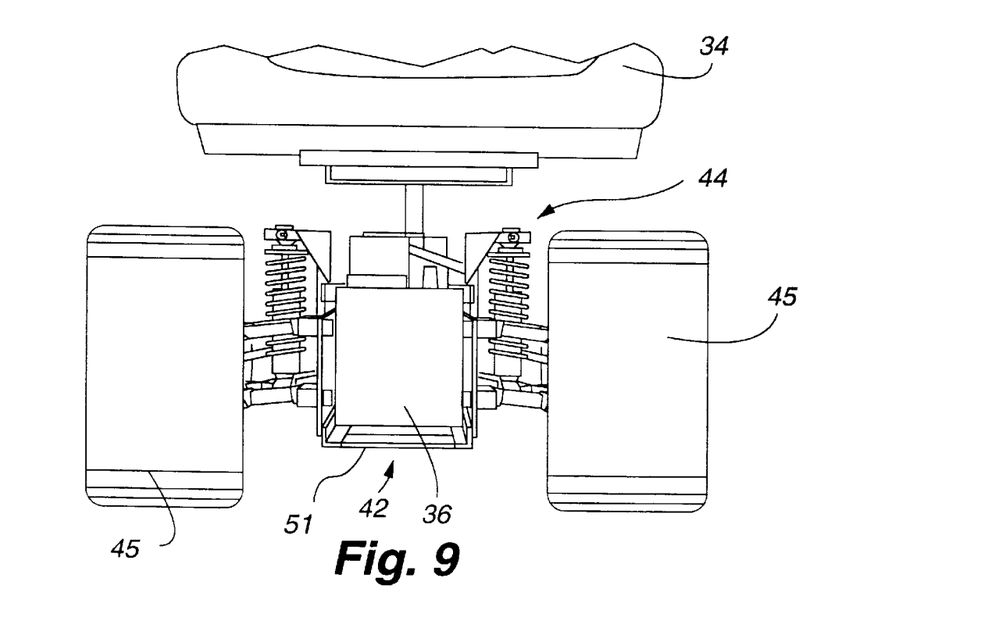
FIG. 9 is a front elevation view of the golf car shown in FIG. 5.

For supporting and steering the front wheels 45 of the vehicle 30, each front wheel 45 is supported on a suspension mechanism 44 and is operatively engaged with the steering mechanism 35 (FIGS. 8–10). Each front wheel suspension mechanism 44 is supported on a chassis or frame plate 60, which is combined with or secured to one side of the forward battery frame 51 and thereby to the chassis frame beam 50. The front wheel suspension mechanism 44 includes a wheel hub 61, which includes a hub plate 62 having a plurality of threaded lug bolts 64 extending therefrom for engagement with a wheel rim 65 defining apertures 66 through which the lug bolts 64 extend for engagement by lug nuts 68 to secure the wheel rim 65 to the hub plate 62. A tire 69 is mounted on the rim 65 and, for the present vehicle, the tires are preferably wide, low pressure tires to provide a large area of support for the vehicle without injuring grass or other surfaces on which the vehicle is driven.

Figure 11:
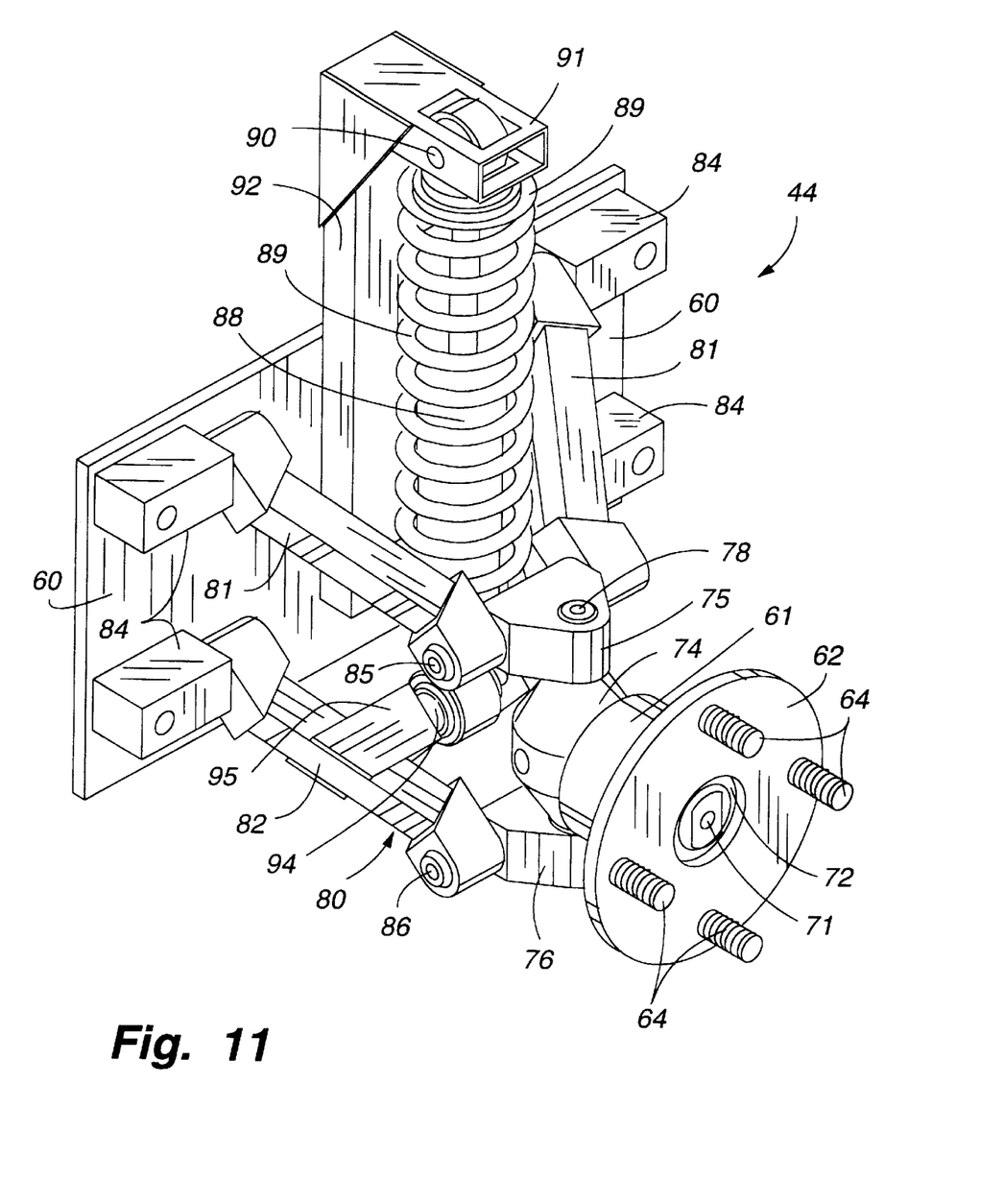
FIG. 11 is an enlarged perspective view of the front wheel suspension used on the golf car shown in FIG. 1.

For supporting the wheel on the suspension mechanism 44, the wheel hub 61 includes a hub sleeve 70 journaled on a front axle 71 by a bearing assembly 72 as shown in FIG. 11. The axle 71 extends outwardly from a spindle 74, which is swingably or pivotally journaled between upper and lower spindle blocks 75, 76 by a spindle shaft and bearings 78. The spindle blocks 75, 76 are mounted for vertical movement with respect to the chassis or frame plate 60 by a 4-bar parallel arm assembly 80. The assembly includes a pair of upper bars or arms 81 and a pair of lower bars or arms 82, a corresponding upper arm 81 and lower arm 82 of each pair being parallel to each other. Each arm is swingably mounted at its chassis end on a frame mount 84 secured to the chassis or frame plate 60 so that the arms can swing in a vertical plane. Appropriate bearings and bearing shafts (not shown) are provided in each mount 84.

At their outer ends, the upper arms 81 are pivotally engaged by spindle shafts and bearings 85 to the upper spindle block 75 while the lower arms 82 are swingably mounted by spindle shafts and bearings 86 to the lower spindle block 76. In this manner, the wheels are confined to vertical movement over a relatively greater distance than the length of the suspension arms 81, 82.

To control the vertical movement of the wheels, a shock absorber 88 and coil suspension spring 89 are provided for each assembly. The shock absorber is secured at its upper end by a pivot pin 90 to a shock absorber bracket arm 91 extending outwardly from a shock absorber bracket 92 secured to the chassis or frame plate 60. At its lower end, the shock absorber is secured to a shock absorber shaft 94 extending between brackets 95 on the lower suspension control arms 82. The suspension coil spring 89 acts between the upper shock absorber bracket arm 90 and the lower end of the shock absorber 88 to cushion the effect of bumps and dips over which the vehicle passes.

For steering the vehicle, the steering assembly includes a horizontal steering handle assembly 96 with outwardly extending handle grips 98 adapted to be held by the driver. The steering handle is secured to a steering post 99 which is in turn connected to each spindle 74. In this manner, the spindles can be turned by turning the handles 98, thereby turning the wheels to steer the vehicle. Appropriate vehicle controls may be secured to the steering handle assembly 96 and steering post 99.

Figure 14:
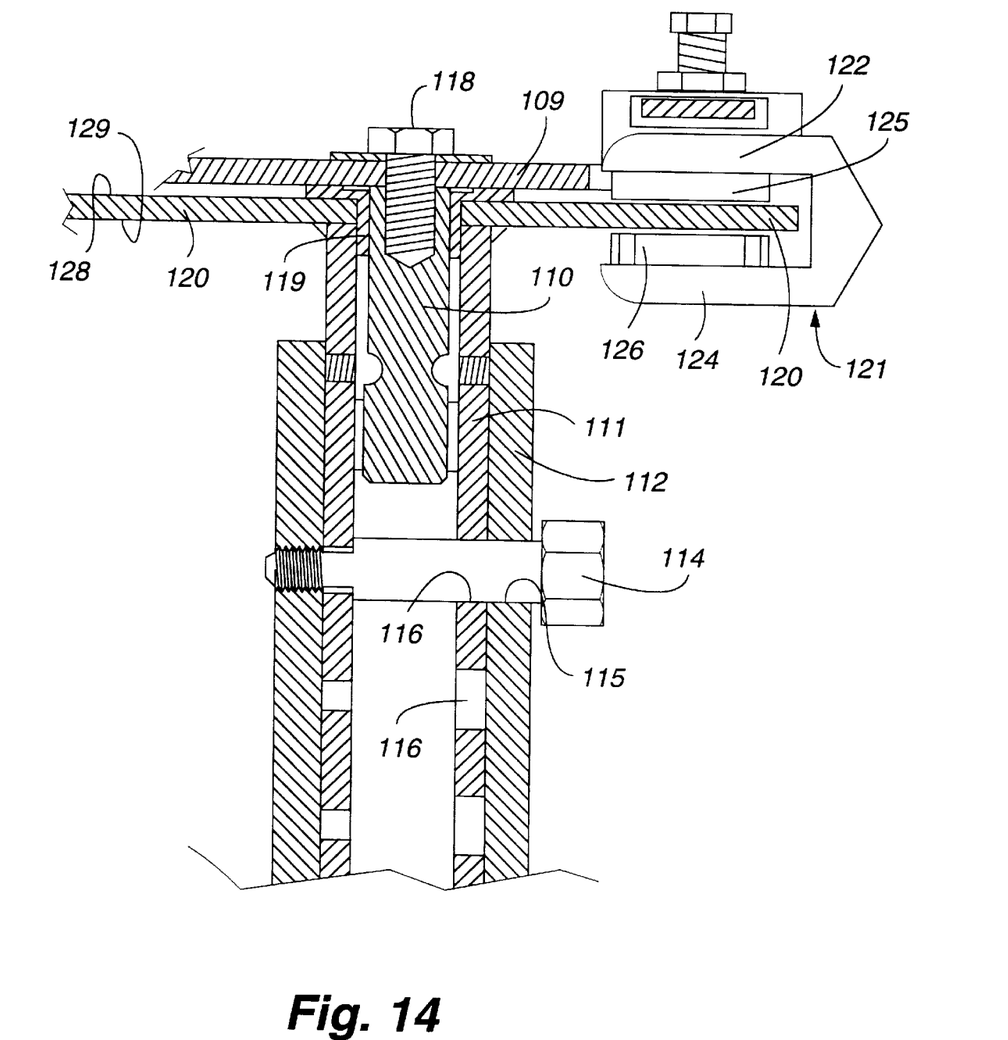
FIG. 14 is an enlarged section view taken substantially in the plane of line 14—14 on FIG. 6.

The vehicle is provided with a seat 34 and seat mounting structure for supporting a rider both in position for driving the vehicle and for making a golf stroke or shot. The seat 34 includes a seat cushion 105 and upright back 106 secured thereto, both of which may be appropriately upholstered. The seat cushion 105 is mounted on a seat frame 108 supported on a frame plate 109 which is in turn mounted on the chassis frame 50 by a seat pin 110 received in a seat mounting sleeve 111 adjustably and telescopingly received in a seat post 112 affixed to the chassis as shown in FIG. 14. The sleeve 111 is slidably and telescopingly received in the seat post 112 and is secured thereto by a shoulder bolt 114 extending through mating apertures 115, 116 in the seat mounting sleeve and seat post, respectively. The seat frame plate 109 is secured by a bolt 118 to the swivel pin 110 which is in turn journaled in bearings 119 in the sleeve 111 in the seat post so that the seat can swivel with respect to the post to enable the user to swivel and fix the seat in any unlimited position of rotation about the seat post 112.

Figure 12:
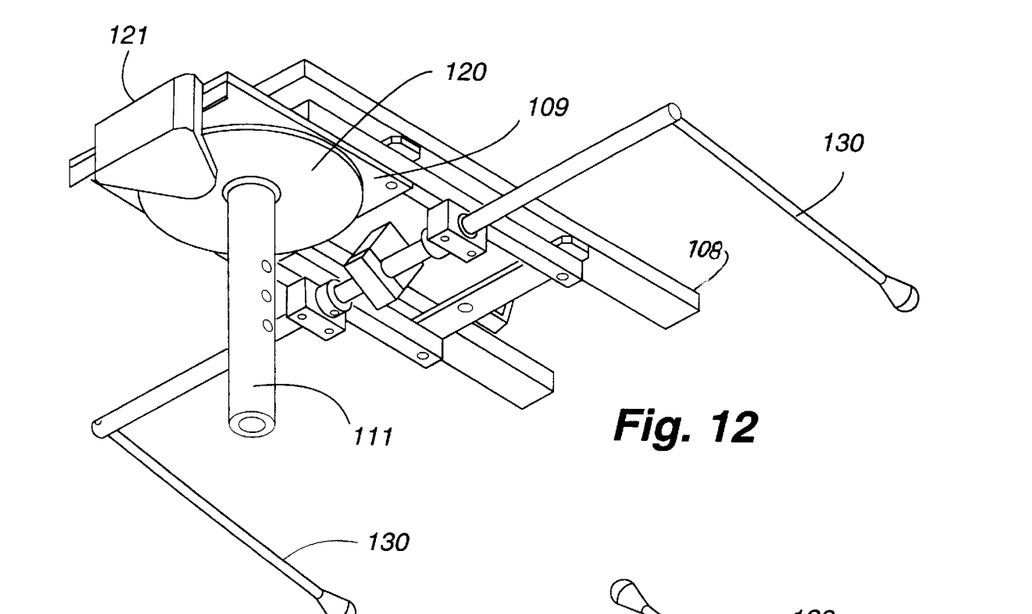
FIG. 12 is an enlarged bottom perspective view of a portion of the seat mounting structure used on the golf car shown in FIG. 1.
Figure 13:
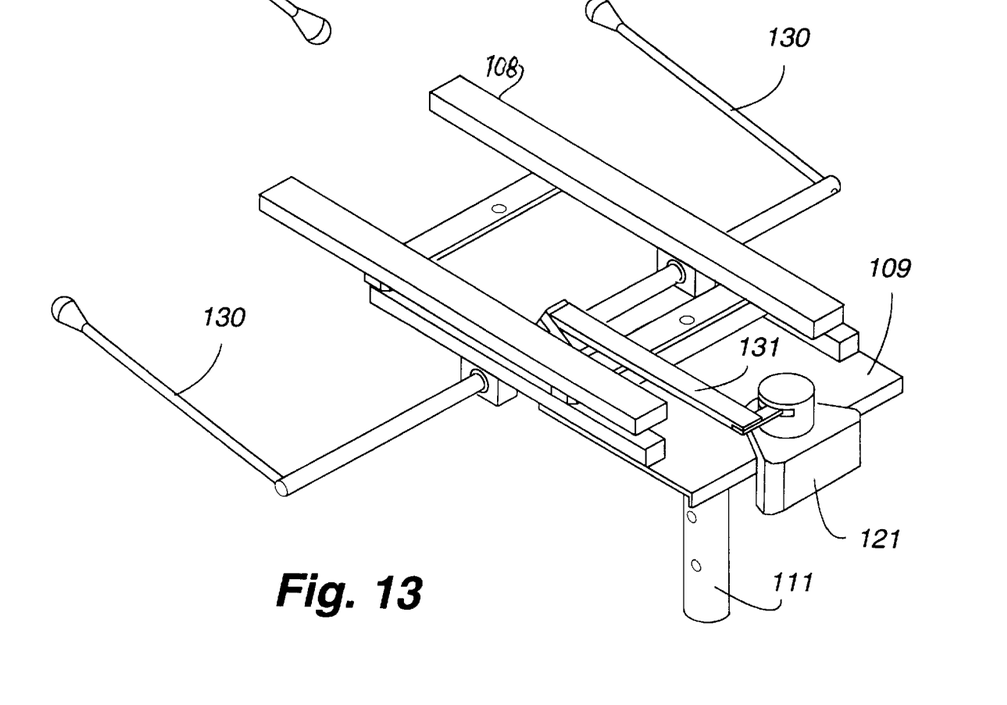
FIG. 13 is an enlarged top perspective view of the seat mounting structure shown in FIG. 12.

For affixing the seat in a desired selected position, a universal brake assembly is provided as shown in FIGS. 12 and 13. To this end, a brake disk 120 is affixed to the seat mounting sleeve 111 and a caliper brake mechanism 121 is mounted on the seat frame plate 109 in operative association with the disk 120 (FIGS. 12–14). The caliper brake 121 has a pair of jaws 122, 124 and brake pads 125, 126 which are positioned over and under the disk 120 and are spring-biased into engagement with the upper and lower surfaces 128, 129 of the disk as shown in FIG. 14. A swivel seat brake or lock lever 130 is pivotally or swingably mounted on the seat mounting frame and is operatively secured to the caliper brake by a link rod 131 pivotally secured at one end to the lever 130 and at its other end to the caliper brake 121. Upon moving the lever 130, the link rod 131 separates or closes the jaws 122, 124 and allows the seat to rotate. Upon release of the brake lever, the spring-biased jaws again grip the disk 129 and lock the seat 34 in position. In this manner, the seat may be positioned directed forwardly of the vehicle for operation of the vehicle controls and steering mechanism, and may be swung to one side or the other or to the rear of the vehicle and locked in position to enable a golfer to sit or lean on the seat while golfing as shown in FIG. 2.

While an illustrative embodiment of the present invention has been shown in the drawings and described in considerable detail, it should be understood that there is no intention to limit the invention to the specific form disclosed. On the contrary, the intention is to cover all modifications, alternative constructions, equivalents and uses falling within the spirit and scope of the invention as expressed in the appended claims.

I claim:

1. A chassis for a single seat dirigible electric battery-powered personal transportation vehicle comprising:

a central elongated beam having a front end and a rear end;

a wheeled drive mechanism mounted on the rear end of said beam;

a swivel seat mounted on same frame in overlying relation to said drive mechanism;

a front battery support frame mounted on the front end of said beam;

spaced apart side plates secured to said front battery support frame;

a wheel suspension with steering mechanism mounted on each side plate;

side battery support frames mounted on said beam rearwardly adjacent said front battery support frame and extending rearwardly and outwardly of same beam; and batteries mounted in said battery support frames to provide electric power to said vehicle and to provide a counterbalance to said seat and drive mechanism.

2. A chassis as defined in claim 1 wherein said central beam is box shaped in cross-section.

3. A chassis as defined in claim 1 further comprising a steering handle operatively secured to said steering mechanism.

4. A chassis as defined in claim 1 further comprising controls for controlling said vehicle operatively mounted on said steering mechanism.

5. A chassis as defined in claim 1 wherein said wheel suspension with steering mechanism comprises a vertical mounting plate mounted on said front battery support frame, a wheel supporting spindle, a parallel arm linkage supporting said spindle on said mounting plate for vertical movement with respect thereto and for pivoting movement with respect to said frame, and a wheel hub rotatably mounted on said spindle for supporting a wheel for rotary movement, pivotal steering movement and vertical movement with respect to said frame.

6. A chassis for a single seat dirigible electric battery-powered personal transportation vehicle comprising:

a central elongated beam having a front end and a rear end;

a wheeled drive mechanism mounted on the rear end of said beam;

a swivel seat mounted on said frame in overlying relation to said drive mechanism;

a front battery support frame mounted on the front end of said beam;

spaced apart side plates secured to said front battery support frame;

a wheel suspension with steering mechanism mounted on each side plate, wherein said wheel suspension with steering mechanism comprises a vertical mounting plate mounted on said front battery support frame, a wheel supporting spindle, a parallel arm linkage supporting said spindle on said mounting plate for vertical movement with respect thereto and for pivoting movement with respect to said frame, and a wheel hub rotatably mounted on said spindle for supporting a wheel for rotary movement, pivotal steering movement and vertical movement with respect to said frame;

side battery support frames mounted on said beam rearwardly adjacent said front batter support frame and extending rearwardly and outwardly of same beam; and batteries mounted in said battery support frames to provide electric power to said vehicles and to provide a counterbalance to said seat and drive mechanism.

7. A chassis as defined in claim 6 wherein said coil suspension spring and said shock absorber are coaxial.

8. A chassis as defined in claim 7 further comprising a steering mechanism for swiveling said spindle and thereby turning a wheel mounted on said wheel hub.

9. A chassis for a single seat dirigible electric battery-powered personal transportation vehicle comprising:

a central elongated beam having a front end and a rear end;

a wheeled drive mechanism mounted on the rear end of said beam;

a swivel seat mounted on said frame in overlying relation to said drive mechanism, wherein said swivel seat comprises a seat frame, a seat including a horizontal cushion and a vertical back mounted on said seat frame, a swivel pin secured to said frame and extending downwardly therefrom, a telescoping swivel post on said golf car for receiving and supporting said swivel pin, a brake disk secured to said swivel post, and a caliper brake on said seat frame in operative engagement with said brake disk for releasably holding said seat in a selected swivel position;

a front battery support frame mounted on the front end of said beam;

spaced apart side plates secured to said front battery support frame;

a wheel suspension with steering mechanism mounted on each side plate;

side battery support frames mounted on said beam rearwardly adjacent said front batter support frame and extending rearwardly and outwardly of same beam; and batteries mounted in said battery support frames to provide electric power to said vehicles and to provide a counterbalance to said seat and drive mechanism.

10. A chassis as defined in claim 9 further comprising a seat brake handle mounted on said seat frame and operatively engaged with said caliper brake.

11. A wheel suspension and steering mechanism for a vehicle having a chassis frame comprising:

a vertical frame plate;

a wheel supporting spindle;

a parallel arm linkage supporting said spindle on said frame plate for vertical movement with respect thereto and for pivoting movement with respect to said chassis frame; and a wheel hub rotatably mounted on said spindle for supporting a wheel for rotary movement, pivotal steering movement and vertical movement with respect to said chassis frame.

12. A wheel suspension and steering mechanism as defined in claim 11 further comprising a coil suspension spring and shock absorber operatively mounted between said mounting plate and said parallel arm linkage.

13. A wheel suspension and steering mechanism as defined in claim 12 further comprising a steering post and steering handle.

14. A wheel suspension and steering mechanism as defined in claim 13 further comprising a link connecting said steering post to said spindle.

15. A swivel seat for a golf car comprising:

a seat frame;

a seat including a horizontal cushion and a vertical back mounted on said seat frame;

a swivel pin secured to said frame and extending downwardly therefrom;

a telescoping swivel post on said golf car for receiving and supporting said swivel pin;

a brake disk secured to said swivel post; and a caliper brake on said seat frame in operative engagement with said brake disk for releasably holding said seat in a selected swivel position.

16. A single seat dirigible electric battery-powered personal transportation vehicle comprising:

a central elongated beam having a front end and a rear end;

a wheeled drive mechanism mounted on the rear end of said beam;

a seat frame;

a seat including a horizontal cushion and a vertical back mounted on said seat frame;

a swivel pin secured to said frame and extending downwardly therefrom;

a telescoping swivel post mounted on said drive mechanism for receiving and supporting said swivel pin;

a brake disk secured to said swivel post;

a caliper brake on said seat frame in operative engagement with said brake disk for releasably holding said seat in a selected swivel position;

a front battery support frame mounted on the front end of said beam;

side battery support frames mounted on said beam rearwardly adjacent said front battery support frame and extending rearwardly and outwardly of said beam;

batteries mounted in said battery support frames to provide electric power to said vehicle and to provide a counterbalance to said seat and drive mechanism;

spaced apart side plates secured to said front battery support frame;

a pair of parallel upper and lower arm assemblies swingably mounted on each said plate;

a wheel spindle mounted between each said arm assemblies, an axle journaled in each said spindle;

a wheel hub plate secured to each said axle;

a coil suspension spring and shock absorber operatively mounted between each said plate and each said lower arm assembly; and a steering handle mounted on said beam and operatively secured to said wheel spindles;

whereby a golfer can utilize said seat in a forward facing position for driving and steering the vehicle and can swivel said seat to one side or the other of said vehicle and fix said seat in a swiveled position to provide a support for the golfer when addressing and striking a golf ball.

* * * * *